United States Patent [19]

Argiropoulos et al.

[11] Patent Number: 4,537,681
[45] Date of Patent: Aug. 27, 1985

[54] CARTRIDGE FILTER END CAP

[75] Inventors: George D. Argiropoulos, Lake Geneva; Somchai Sahachaisere, Darien, both of Wis.

[73] Assignee: Sta-Rite Industries, Inc., Milwaukee, Wis.

[21] Appl. No.: 512,223

[22] Filed: Jul. 11, 1983

[51] Int. Cl.³ ............................................... B01D 27/06
[52] U.S. Cl. ..................................... 210/317; 210/438; 210/440; 210/493.1; 55/499
[58] Field of Search ................ 210/443, 445, 453, 455, 210/457, 458, 493.1, 493.2, 493.5, 438, 315, 316, 317, 451, 459, 498, 295, 338, 440, 444, 497.01; 55/499

[56] References Cited

U.S. PATENT DOCUMENTS

| | | | |
|---|---|---|---|
| 2,465,579 | 3/1949 | Eduards | 210/443 |
| 2,770,368 | 11/1956 | Tischer | 210/443 |
| 2,809,754 | 10/1957 | Pudlo | 210/443 |
| 3,211,292 | 10/1965 | Bull | 210/342 |
| 3,322,281 | 5/1967 | Gulick | 210/443 |
| 3,331,509 | 7/1967 | Gray | 210/315 |
| 3,332,554 | 7/1967 | Humbert, Jr. | 210/443 |
| 3,370,708 | 2/1968 | Hultgren et al. | 210/315 |
| 3,386,585 | 6/1968 | Woyand et al. | 210/455 |
| 3,746,174 | 7/1973 | Watanabe | 210/443 |
| 3,923,663 | 12/1975 | Reid | 210/443 |
| 3,988,244 | 6/1975 | Brooks | 210/440 |
| 4,317,727 | 3/1982 | Meissner | 210/498 |

Primary Examiner—Richard V. Fisher
Assistant Examiner—Wanda L. Millard
Attorney, Agent, or Firm—Mason, Kolehmainen, Rathburn & Wyss

[57] ABSTRACT

A cartridge fluid filter includes a housing within which are positioned annular, concentrically mounted filter elements that are held together in relative position by first and second end caps to define a gap between the filter elements. A filter core is positioned within the gap that communicates with an outlet defined in the first end cap. An annular reinforcing disc is mounted in the first end cap to support the end cap around the outlet.

4 Claims, 6 Drawing Figures

CARTRIDGE FILTER END CAP

BACKGROUND OF THE INVENTION

A. field of the Invention

The present invention relates to a new and improved cartridge filter and more particularly, to a new and improved cartridge filter including annular concentrically mounted filter elements secured between an impervious end cap and an end cap that includes an outlet and is reinforced by a reinforcing disc.

B. Description of the Prior Art

It is desirable in many fluid systems to recycle the working fluid through a filter to prevent the accumulation of foreign matter that could result in damage or impairment of the system. Concentric filter elements in a filter cartridge housing have been found to be efffective in performing the filtering function. Examples of filter units employing concentric filter elements are disclosed in U.S. Pat. Nos. 3,211,292, 3,988,244 and 4,317,727. The filter devices disclosed in these patents each includes a pair of concentrically mounted filter elements enclosed within a casing or housing between upper and lower end caps. These filter devices employ rigid elements or a filter core such as a plastic netting or a tubular plastic core, positioned between the concentrically mounted filter elements. The rigid elements or filter core prevents collapse of the filter elements due to forces resulting from a pressure drop across the filter elements and maintains the concentric filter elements in proper configuration while defining a passage for flow to the outlet of the filter. The rigid support elements such as disclosed in U.S. Pat. No. 3,211,292 must be of sufficient strength to resist the total force applied to one filter element. The use of these support elements results in complex assembly and manufacturing increasing the cost of the filter. The filter core elements such as disclosed in U.S. Pat. Nos. 3,988,244 and 4,317,727 overcome the disadvantages of using rigid support elements; however, it has been discovered that there is a vertical downward force tending to push the filter core through the outlet in the lower end cap, and damage the filter media. It is desireable to employ the filter core due to the reduced assembly and manufacturing costs while preventing damage to the end cap and the effectiveness of the filter media due to the vertical downward force applied by the filter core.

SUMMARY OF THE INVENTION

An object of the present invention is to provide a new and improved device for filtering fluid in a fluid system.

Another object of the present invention is to provide a new and improved filtering device including concentric filter elements held in position by a pair of end caps one of which includes an outlet reinforced by a reinforcing element to inhibit distortion during operation.

Briefly, the present invention is directed to a new and improved device commonly referred to as a cartridge filter for filtering working fluid in a fluid system. The cartridge filter includes a housing or casing within which are first and second annular, concentrically mounted filter elements. The filter elements are held by first and second end caps to define a gap between the filter elements. A filter core is positioned within the gap for transmission of filtered fluid to an outlet in the first end cap. The outlet in the first end cap is reinforced by an annular disc that inhibits distortion that may constrict flow through the outlet.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DETAILED DESCRIPTION OF THE PREFERRED ENBODIMENT

Figure 1:
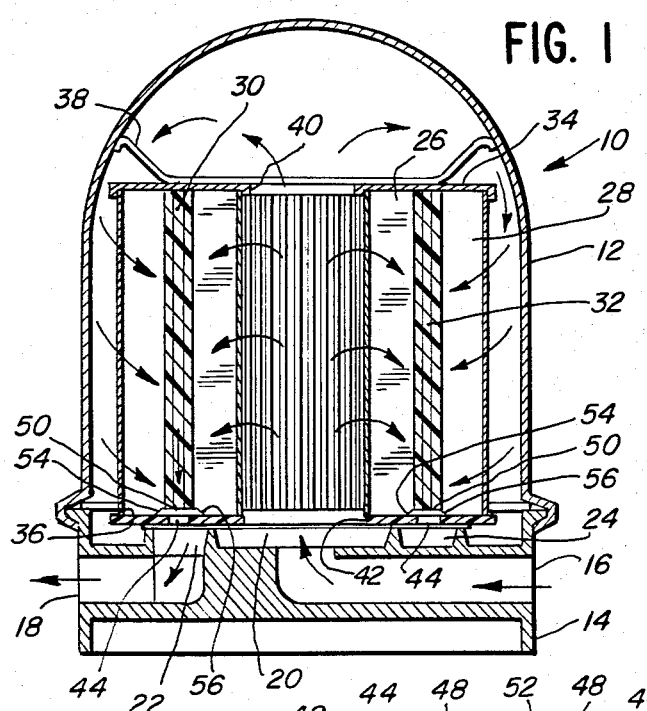
FIG. 1 is a vertical cross sectional view of a cartridge filter including an end cap constructed in accordance with the principles of the present invention.

Referring to the drawings and initially to FIG. 1, there is illustrated a cartridge filter generally designated by the reference numeral 10. Cartridge filter 10 may be incorporated into a fluid system for filtering working fluid. The cartridge filter 10 includes two exterior members; inpervious housing 12 and a base 14. The cartridge filter 10 is connected to a working fluid system by an inlet port 16 and an outlet port 18. The inlet port 16 is in fluid communication with the interior of the impervious housing 12 through an enlarged opening 20. The outlet 18 is also in fluid communication with the interior of the housing 12 through an opening 22 that communicates with an annular channel 24 fabricated in the upper surface of the base 14. Mounted within the housing 12 and upon the base 14 are a pair of concentric or telescoped annular filter elements 26 and 28. Filter elements 26 and 28 may be pleated filter media that are positioned within housing 12 to define a gap or space 30 between them.

Figure 5:
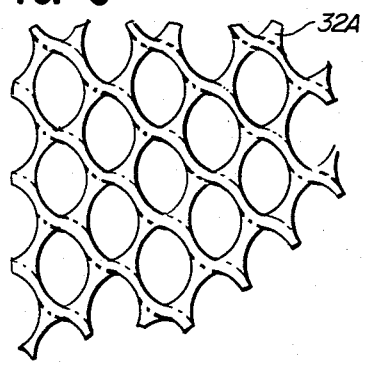
FIG. 5 is a partial, greatly enlarged view of a portion of the fluid carrier of the filter assembly.
Figure 6:
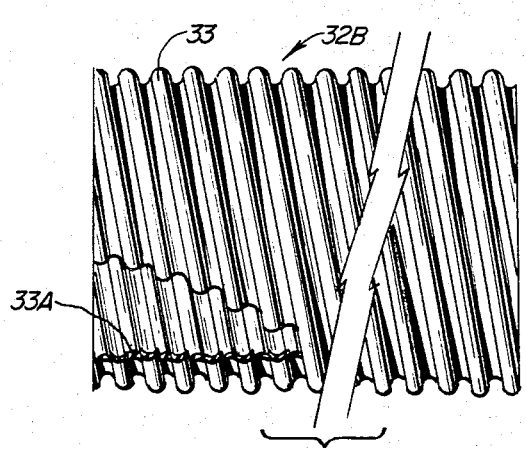
FIG. 6 is an alternative core.

A fluid carrier element or filter core 32 is positioned within the gap 30 and may be a molded plastic netting wound about itself several times. An example of such netting is illustrated in FIG. 5 and designated by the reference numeral 32A. An alternative core is illustrated in FIG. 6 and designated by the reference numeral 32B. Filter core 32 B is an extruded rigid plastic tube that is threaded on the outer and inner peripheral surfaces to define threads 33 and 33A, respectively. Threads 33 and 33A provide fluid passages to the opening 22 and define smooth surfaces facing filter elements 26 and 28 for minimum resistance to fluid flow. The mesh configuration allows transverse and longitudinal flow of fluid through the carrier element 32 such that it presents little resistance to fluid flow. To maintain the concentric filter elements 26 and 28 and the carrier element 32 in a stable position within the housing 12, these members are positioned between an upper end cap 34 and a lower end cap 36. A strap 38 is positioned within the upper end of the housing 12 to press against the upper end cap 34 capturing the filter elements 26 and 28 and the fluid carrier 32 between the strap 38 and the upper end of the base 14.

Upper end cap 34 includes a central aperture 40 allowing fluid to flow upward through the aperture 40 into the interior of the housing 12 and around and through the filter element 28 to the carrier 32. The lower end plate 36 includes a central aperture 42 through which fluid from inlet 16 flows. Part of the fluid flowing upward through aperture 42 passes through the pleated filter element 26 to the fluid carrier 32. Lower end cap 36 also includes a plurality of water passage slots 44 aligned with the carrier 32 allowing filtered fluid passing along the carrier 32 to flow through the slots 44 to the annular channel 24 to be communicated to the outlet 18.

Figure 2:
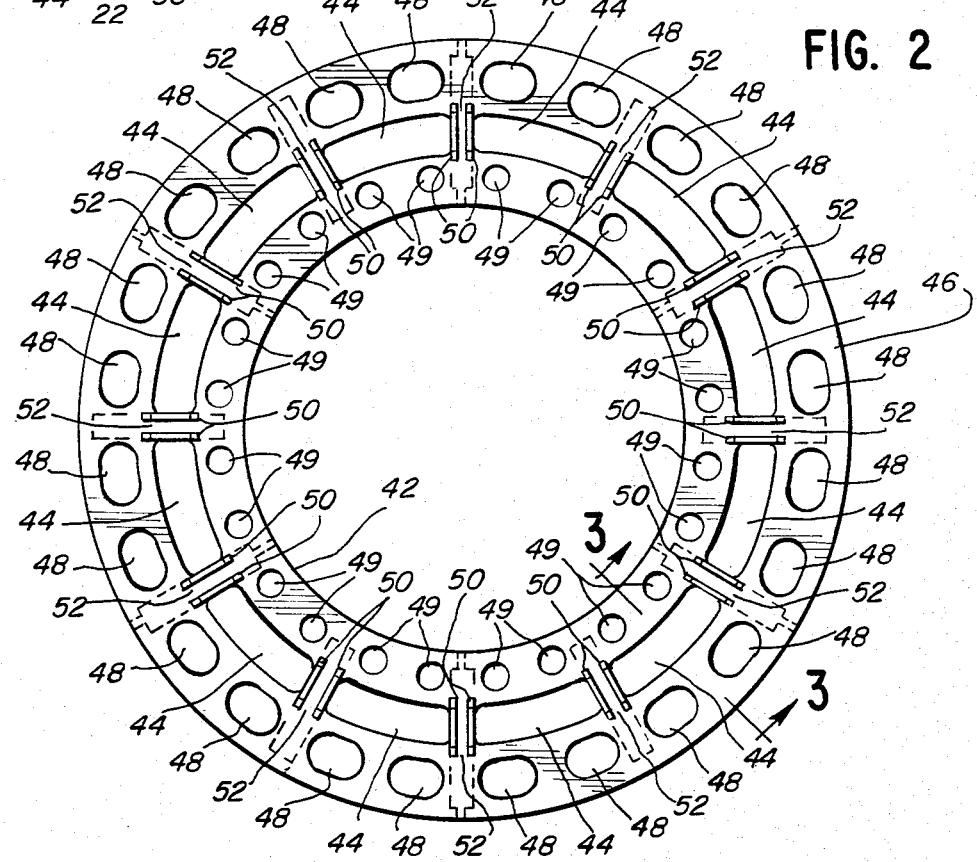
FIG. 2 is a top plan view of a support liner for an end cap constructed in accordance with the present invention.
Figure 4:
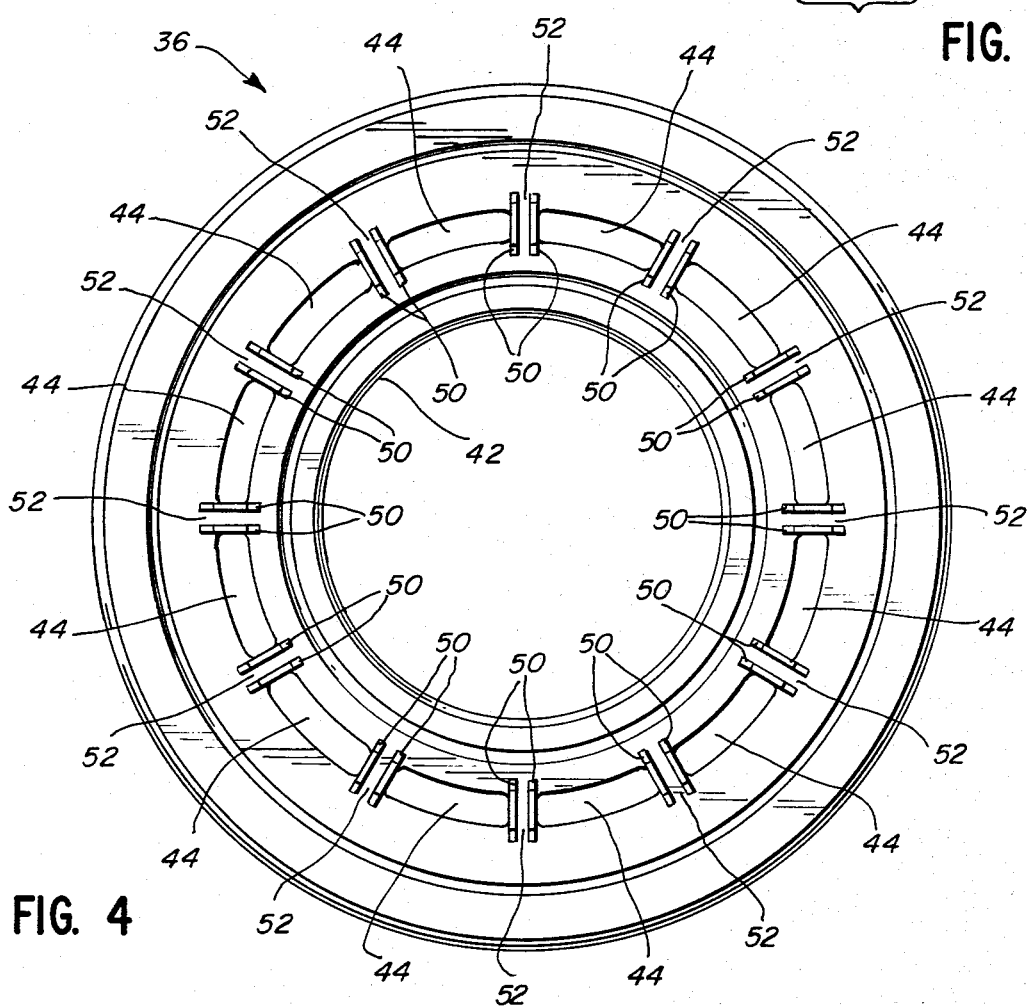
Fig. 4 is a plan view of the end cap of the present invention.

The lower end plate 36 includes a support liner 46 (FIG. 2) embedded in a plastisol or any other synthetic polymer or elastomeric molding compound material of variable hardness that is then fused and solidified around the liner 46 to form the end cap 36, (FIG. 4). The support liner 46 when molded with plastisol or similar material controls the shrinkage of the plastisol. The support liner 46 is a planar, annular member in which the water passage slots 44 and central aperture 42 are formed. Support liner 46 also includes a plurality of openings 48 and 49 that are formed in the liner 46 to remove excess material and allow the plastisol to flow around and through without leaving any air gaps before it solidifies. Between and adjacent to the ends of each water passage slot 44 is a support rib 50. The support ribs 50 provide extra thickness and support in the liner 46 adjacent each the water passage slot 44. Once the end cap support liner 46 has been embedded in the plastisol or other synthetic polymer or elastomeric molding compound, only slots 44 and aperture 42 are open in the end cap 36 (FIG. 4).

Upper end cap 34 and lower end cap 36 experience equal fluid pressure during operation of the fluid filter 10; however, since the lower end cap 36 includes the slots 44, the pressure that would be experienced at the slots 44 if no material had been removed and sitting over annulus 24, acts against the fluid carrier 32 tending to force the carrier through the water passage slots 44. This force is concentrated around each water passage passage slot 44 tending to buckle the end cap 36 at these locations. The ribs 50 function to reinforce the end cap 36 in the areas surrounding the water passage slots 44 preventing buckling of the end cap 36 around the water passage slots 44. Buckling in these areas could damage or obstruct flow through the slots 44 decreasing the efficiency of the filter 10.

Figure 3:
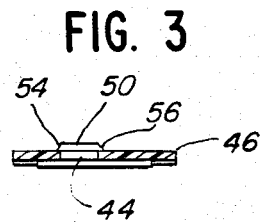
FIG. 3 is a view taken along line 3—3 of FIG. 2.

The ribs 50 are positioned such that a space 52 is defined between the ribs 50. Each space 52 functions as a locater or positioning device for the pleats of the pleated filter elements 26 and 28. A pleat of each filter elements 26 and 28 is positioned into each space 52 thereby assisting in locating the filter elements 26 and 28 within the housing 12 and maintaining them in proper alignment. Each of the ribs 50 includes ends 54 and 56 (FIG. 3) that are inclined at approximately a 45° angle. The ends 54 and 56 are engaged by the lower end of the fluid carrier 32 evenly distributing the downward force. This even distribution of forces assists in preventing damage to the end cap 36 and avoids buckling around slots 44 that could obstruct fluid flow.

What is claimed and sought to be secured by Letters Patent of the United States is:

1. A fluid filter assembly, comprising:
a housing including means defining an inlet and an outlet,
a fluid filter cartridge mounted in said housing, said cartridge including first and second end caps, first and second tubular filter media concentrically mounted between said first and second end caps, said first and second filter media spaced apart to define a gap therebetween,
said first end cap including means defining an outlet in fluid communication with said housing outlet, said outlet in said end cap being in alignment with said gap, and
a reinforcing member in said first end cap surrounding said outlet in said first end cap, said reinforcing member including first and second inclined ends, wherein said first end cap outlet is annular, said reinforcing member is annular and includes means defining a plurality of openings in fluid communication with said outlet in said first end cap, and radial rib members on said reinforcing member adjacent each said opening, a space defined between adjacent rib members, at least a portion of said first and second filter media located in said space.

2. An end cap for a fluid filter cartridge mounted in a filter housing with means defining an inlet and outlet, said fluid filter cartridge including first and second tubular filter media concentrically mounted on said end cap and spaced apart to define a gap, a fluid carrier positioned in said gap, said end cap comprising,
a body of synthetic polymer or elastomeric molding compound of varied hardness with a fluid outlet therein,
a planar, circular disc embedded in said body,
at least one slot in said disc overlying said fluid carrier and said outlet,
at least one support rib in said disc adjacent said slot, said rib extends outwardly from said planar disc, and a second support rib, said slot including first and second ends, said first rib mounted in said disc adjacent said first end of said slot, said second rib mounted in said disc adjacent said second end of said slot, each said first and second rib including first and second inclined ends, said inclined ends engaging and supporting said fluid carrier.

3. A fluid filter cartridge assembly, comprising:
an outer annular filter element,
an inner annular filter element concentric and inside said outer element,
first and second end caps secured to the inner and outer filter elements,
said inner and outer filter elements mounted on said first and second end caps to define a gap therebetween,
a filter core mounted in said gap between said inner and outer filter elements,
at least one means defining an outlet aperture, in said first end cap adjacent to and in fluid communication with said filter core, and
an annular support disc in said first end cap, said disc including upper and, lower planar surfaces, and including at least one means defining an opening adjacent said outlet aperture, said opening aligned with said filter core, and means on said disc for reinforcing said disc, said reinforcing means defined on and extending outwardly from said upper planar surface, said filter core positioned on said reinforcing means said opening in said support disc is annular with first and second ends and said reinforcing means includes radial ribs adjacent said first and second ends of said opening.

4. A fluid filter cartridge assembly, comprising:
an outer annular filter element, an inner annular filter element concentric and inside said outer element, first and second end caps secured to the inner and outer filter elements, said inner and outer filter elements mounted on said first and second end caps to define a gap therebetween, a filter core mounted in said gap between said inner and outer filter elements, at least one means defining an outlet aperture in said first end cap adjacent to and in fluid communication with said filter core, and an annular support disc in said first end cap, said disc including upper and lower planar surfaces, and including at least one means defining an opening adjacent said outlet aperture, said opening aligned with said filter core, and means on said disc for reinforcing said disc, said reinforcing means defined on and extending outwardly from said upper planar surface, said filter core positioned on said reinforcing means, means defining a plurality of openings in said first support disc, said reinforcing means including ribs adjacent each said plurality of openings, said ribs defining a space between adjacent ribs, at least a portion of said inner and outer annular filter elements being located in said spaces.

* * * * *